(12) United States Patent
Fleischer et al.

(10) Patent No.: US 8,625,103 B2
(45) Date of Patent: Jan. 7, 2014

(54) INTERFEROMETRIC SYSTEM AND METHOD FOR ADJUSTING A PATH DIFFERENCE

(75) Inventors: Matthias Fleischer, Ostfildern (DE); Thomas Seiffert, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 441 days.

(21) Appl. No.: 12/736,656

(22) PCT Filed: Apr. 1, 2009

(86) PCT No.: PCT/EP2009/053878
§ 371 (c)(1),
(2), (4) Date: Feb. 15, 2011

(87) PCT Pub. No.: WO2009/132919
PCT Pub. Date: Nov. 5, 2009

(65) Prior Publication Data
US 2011/0128551 A1    Jun. 2, 2011

(30) Foreign Application Priority Data
Apr. 30, 2008 (DE) .......................... 10 2008 001 482

(51) Int. Cl.
*G01B 11/02* (2006.01)
(52) U.S. Cl.
USPC ........................................................ 356/497
(58) Field of Classification Search
USPC ................................................ 356/496–498
See application file for complete search history.

(56) References Cited

U.S. PATENT DOCUMENTS

| 2,841,049 A | | 7/1958 | Scott | |
|---|---|---|---|---|
| 3,597,091 A | * | 8/1971 | Bowker | 356/498 |
| 3,796,494 A | * | 3/1974 | Takabayashi | 356/500 |
| 7,426,039 B2 | * | 9/2008 | Badami et al. | 356/503 |
| 2004/0174535 A1 | * | 9/2004 | Kuramoto | 356/515 |

FOREIGN PATENT DOCUMENTS

| DE | 10 2004 045 806 | | 4/2006 |
|---|---|---|---|
| DE | 10 2004 045 808 | | 4/2006 |
| DE | 102004045806 A1 | * | 4/2006 |

(Continued)

OTHER PUBLICATIONS

Richter, Claus et al., Highly improved measurement speed of white light interferometry, DGaO Proceedings 2005, ISSN 1614-8436 (2005).*

(Continued)

*Primary Examiner* — Michael A Lyons
(74) *Attorney, Agent, or Firm* — Kenyon & Kenyon LLP

(57) ABSTRACT

An interferometric system for measuring a measured object, having an arrangement for generating a measuring beam path, measuring beams being directed at the measured object, having an arrangement for generating a reference beam path, reference beams being directed to a reference element, having an adjusting arrangement for adjusting a path difference between the measuring beams and the reference beams, and a having a detector for recording images of the superposition of the reference beams and the measuring beams reflected by the measured object. According to the present system, a synchronization arrangement is used to control the adjusting arrangement so that the path difference between the measuring beams and the reference beams is adjusted in synchronization with the images recorded by the detector. The present system also relates to a method for adjusting a path difference.

12 Claims, 1 Drawing Sheet

(56) References Cited

FOREIGN PATENT DOCUMENTS

| | | | |
|---|---|---|---|
| FR | 1 153 098 | | 2/1958 |
| FR | 1153098 A | * | 2/1958 |
| JP | 1-143906 | | 6/1989 |
| JP | 1143906 A | * | 6/1989 |
| JP | 2009 036601 | | 2/2009 |
| WO | WO 2006/071569 | | 7/2006 |
| WO | WO 2006071569 A2 | * | 7/2006 |
| WO | WO 2009098126 A1 | * | 8/2009 |

OTHER PUBLICATIONS

Richter, Claus et al., Highly improved measurement speed of white light interferometry, DGaO Proceedings 2005, Abstract (2005).*

Bruning, J.H. et al., Digital Wavefront Measuring Interferometer for Testing Optical Surfaces and Lenses, Applied Optics, vol. 13, No. 11 (Nov. 1974), pp. 2693-2703.*

Ishii, Yukihiro et al., Digital phase-measuring interferometry with a tunable laser diode, Optics Letters, vol. 12, No. 4 (Apr. 1987), pp. 233-235.*

Kubota, Toshihiro et al., Interferometer for measuring displacement and distance, Optics Letters, vol. 12, No. 5 (May 1987), pp. 310-312.*

Lewotsky, Kristin, Interferometer measures both sides of disk, Laser Focus World (Sep. 1997), pp. 52-53.*

Ikonen, E. et al., Interferometric length measurements, SPIE vol. 1756, Interferometry: Applications (1992), pp. 86-97.*

"Interferometer Measues Both Sides of Disk", Laser Focus World, Pennwell, Tulsa, OK, US, Sep. 1, 1997, pp. 52/53, XP001182916, ISSN : 1043-8092.

* cited by examiner

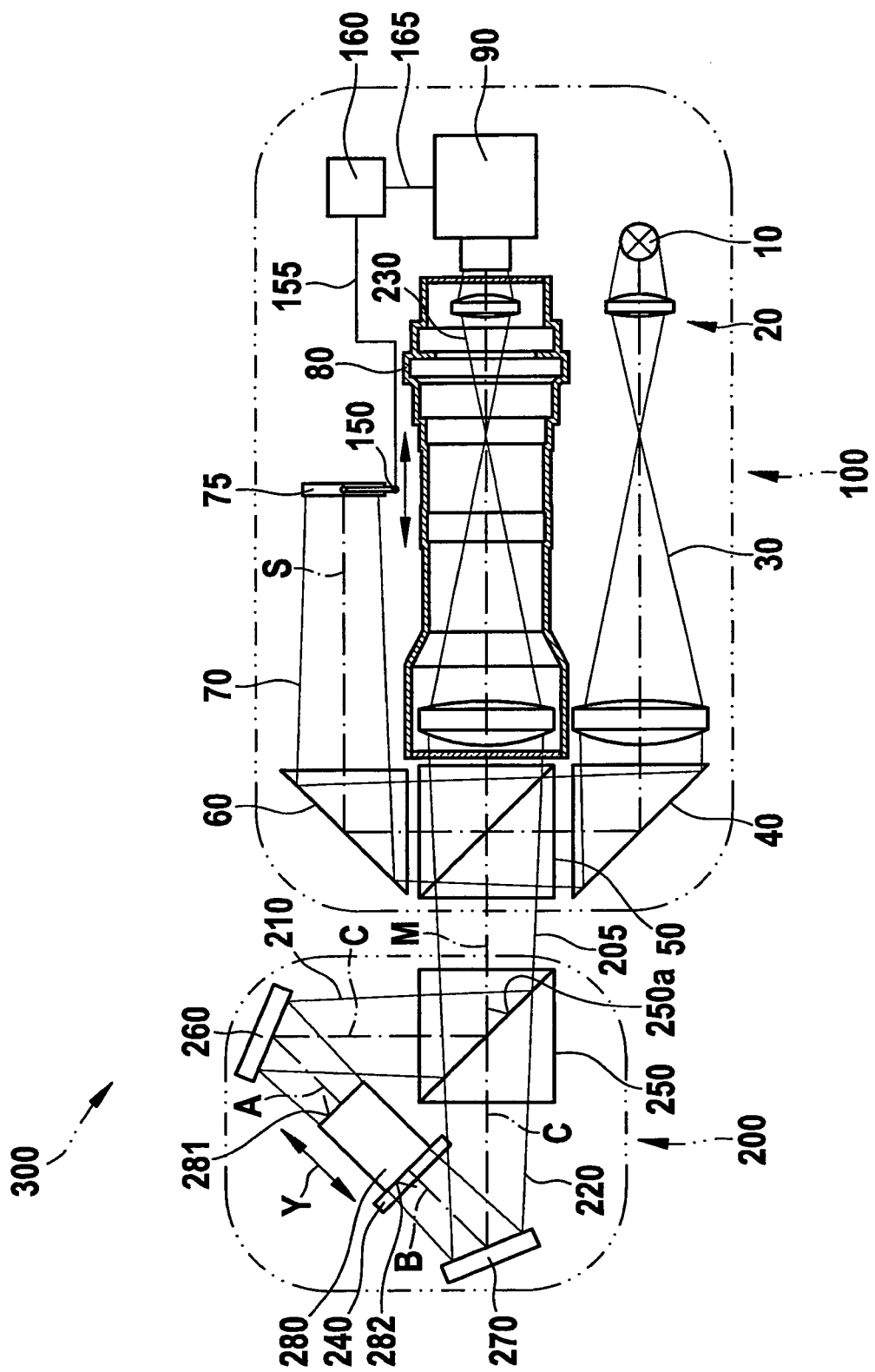

INTERFEROMETRIC SYSTEM AND METHOD FOR ADJUSTING A PATH DIFFERENCE

FIELD OF THE INVENTION

The present invention relates to an interferometric system, in particular a white light interferometer system for measuring a measured object, in particular for measuring at least one surface of a measured object, and a method for adjusting a path difference between measuring beams and reference beams in an interferometric system.

BACKGROUND INFORMATION

In white light interferometers, the optical path difference between measuring beams and reference beams is varied in increments with the aid of a piezoelectric actuator. Detector images (camera images) are recorded in this process. The optical path difference in which interferences occur in the detector images is an indicator of the measured height value or distance value.

With most white light interferometers, the detector and the adjusting arrangement are operated side-by-side without synchronization and without feedback. Very cost-intensive white light interferometers regulate the adjusting arrangement with the aid of an external laser interferometer and thus keep the scanning of the measured object constant at each step, but with a free-running detector. One possibility for synchronizing the detector and the adjusting arrangement is to measure the displacement distance traveled and to trigger the detector as a function of this displacement distance at suitable scan points. However, this presupposes the use of a triggerable detector, but then only half the speed of the detector may be utilized because with the linear adjusters typically used as an adjusting arrangement, the fluctuation in the scan width is between 50% and 200%.

If the coupling between the scanning by the detector and the change in the optical path difference is imprecise, this affects the accuracy of the measurement results. Systematic vibrations in particular distort the result disproportionately. Tribological effects also have a particularly strong influence due to the low rate of change in the path difference, typically amounting to approximately 80 nm per camera cycle.

SUMMARY OF THE INVENTION

Technical Object

An object of the exemplary embodiments and/or exemplary methods of the present invention is therefore to propose an interferometric system using which extremely precise measurements may be performed. Furthermore, the object is to propose a method for adjusting the path difference between measuring beams and reference beams in such a way as to ensure a precise measurement.

Technical Approach

This object is achieved by the features described herein with regard to the interferometric system and by the features further described herein with regard to the method.

Advantageous refinements of the exemplary embodiments and/or exemplary methods of the present invention are further defined herein. All combinations of at least two of the features described in the description or claims and/or illustrated in the figures fall within the scope of the exemplary embodiments and/or exemplary methods of the present invention. To avoid repetition, features described with regard to the device should also be considered as described with regard to the method. Likewise, features disclosed with regard to the method should also be considered as described and claimable with regard to the device.

The exemplary embodiments and/or exemplary methods of the present invention are based on the idea of assigning the synchronization arrangement to the adjusting arrangement, which include in particular a linear adjuster, the synchronization arrangement being configured to trigger the adjusting arrangement, in such a way that the path difference is adjusted by adjusting the reference element in synchronization with the images generated by the detector, which may be including a digital camera. In other words, with the aid of the adjusting arrangement, at least one component of the interferometric system, in particular the measured object, is advanced further in synchronization with the images recorded by the detector, so that an accurate coupling between the scanning of the measured object by the camera and the change in the optical path difference is maintained, which has a positive effect on the accuracy of the measurement results obtained.

To put it another way, with the aid of the synchronization arrangement, the adjusting arrangement are synchronized with the image frequency of the images recorded by the detector, the result being that the path difference between the measuring beams and the reference beams changes in synchronization with the image frequency of the detector. It is advantageous in particular to provide such a synchronization arrangement in the case of interferometric systems operating with short-coherent light because the optical path difference here is an important indicator for the measured height value or distance value. The path difference may in particular be evaluated as an indicator of the thickness of the measured object if a special optical system for illuminating two surfaces of the measured object is provided, as explained below. The movement pattern with which the adjusting arrangement adjusts the path difference need not take place in uniform increments, although that may be preferred. A continuous path difference adjustment may also be implemented. Alternatively, it is possible for complex movement patterns to be implemented, in particular by providing a lookup table, as referred to in Claus Richter, Gerd Häusler: DGaO Proceedings, 106, A4 (2005).

Adjustment via the adjusting arrangement in the (minimal) pauses between two images is particularly advantageous. If the adjusting time is not sufficient in particular, it may be advantageous to trigger a light source for illuminating the measured object as a function of the images, i.e., the image frequency of the detector, in addition to providing the adjusting arrangement, i.e., to illuminate the measured object in a pulsed manner in synchronization with the images to thereby ensure that a (visible) image is recorded by the detector only when the adjusting arrangement is inactive. Synchronization of the light source with the detector may be implemented here as discussed in DE 10 2008 008 559.6, which should be considered in this regard as belonging to the disclosure content of the present patent application.

Particularly advantageous is a specific embodiment of the interferometric system, in which the synchronization arrangement are configured to trigger the adjusting arrangement, so that a defined path difference, i.e., a defined relative position between two adjustable components of the system, in particular the reference element relative to the detector, corresponds to each image recorded by the detector. A defined path difference between the measuring beams and the reference beams may thus be assigned to each image, and subsequently the exact (relative) position value, at which an interference between the measuring beams reflected by the measured object and the reference beams reflected in particular by the reference element occurs for the first time, may be assigned to each image.

A specific embodiment in which the adjusting arrangement include at least one linear adjuster, which may be a piezoelectric actuator (piezoelectric controller) in particular. Very accurate minimal adjustment paths are implementable using a piezoelectric controller. The piezoelectric actuator in particular may be situated in such a way that it adjusts the reference element, in particular a mirror, in a defined manner in relation to the detector, other components of the system also being adjustable via the piezoelectric actuator to influence the path difference between the measuring beams and the reference beams, for example, the measured object itself.

The synchronization arrangement may particularly be configured in such a way that they are set up to evaluate a detector signal, in particular a video signal of the detector. The synchronization arrangement in particular monitor the detector signal for the occurrence of significant pulses integral to the signal. The synchronization arrangement in particular may monitor the detector signal with regard to the occurrence of frame synchronization pulses on the basis of which the synchronization arrangement subsequently generate trigger signals for direct or indirect triggering of the adjusting arrangement.

Particularly advantageous is a specific embodiment in which the synchronization arrangement include a separating circuit, which generates a trigger signal as a function of the occurrence of a pulse, in particular a frame pulse, which is integral to the detector signal, the adjusting arrangement adjusting the path difference of the measuring beams to the reference beams, i.e., the relative position between two components of the interferometric system as a function of this trigger signal.

In a refinement of the exemplary embodiments and/or exemplary methods of the present invention, it is advantageously provided that the synchronization arrangement include a counter, implemented in particular as a counter circuit whose counter value is altered, which may be incremented, as a function of the trigger signal, in particular by a defined, predetermined or predeterminable value. It particularly may be the case that the path difference, which is adjustable via the adjusting arrangement, may be proportional to the counter value. This may be achieved in particular by sending the counter value to a digital-analog converter, so that the adjusting arrangement is triggered by the digital-analog converter in such a way that the adjusting arrangement regulates to a position value (path difference) proportional to the output voltage of the digital-analog converter.

It may particularly be the case that the counter may be implemented as a counter circuit, which is integrated into a programmable integrated circuit, in particular a field-programmable gate array (FPGA), so that changes in the counter circuit may be implemented by simple programming of an EEPROM.

Particularly advantageous is a specific embodiment of the interferometric system in which the detector has at least one digital camera using which, images of the superposition of the measuring beams reflected by the measured object and of the reference beams reflected in particular by the reference element are recorded.

As mentioned above, it may particularly be the case that the interferometric system may be configured to operate with short-coherent light. In other words, a shared light source emitting short-coherent light is provided for generating the measuring beams and the reference beams. This may particularly be a white light source.

The exemplary embodiments and/or exemplary methods of the present invention is also directed to a method for adjusting a path difference between measuring beams of a measuring beam path directed at a measured object and reference beams of a reference beam path directed at a reference element in an interferometric system, which may be configured to operate by using short-coherent light. The interferometric system for performing the method includes at least one detector, which may be include a digital camera, for generating (recording) images of a superposition of measuring beams reflected by the measured object and of reference beams which may be reflected by the reference element.

It is provided according to the exemplary embodiments and/or exemplary methods of the present invention that the path difference between the measuring beams and the reference beams is adjusted in synchronization with the images recorded by the detector, in particular with the frame frequency. The path difference between the reference beams and the measuring beams may be synchronized with the detector, so that a defined path difference, i.e., a defined relative position between two components of the interferometric system, which may be between the detector and the reference element, in particular embodied as a mirror, corresponds to each image recorded by the detector.

A specific embodiment of the interferometric system which includes an optical system for illuminating at least one surface of the measured object may particularly be the case, the optical system being situated in the measuring beam path of the interferometric system, in particular an interferometer measuring head of the interferometric system. The optical system for illuminating at least one object surface may provide at least one first optical element which generates at least one first and at least one second beam path when light beams (measuring beams) of a beam-generating light source are introduced. The light beams in the first beam path are directed at a first object surface, which may be perpendicularly, via a second optical element downstream from the first optical element in the path of the light. Furthermore, light beams in the second beam path are directed at a second object surface, which may be perpendicularly, via a third optical element downstream from the first optical element in the light path. In an advantageous manner, the light beams in the first beam path originate from the largest possible area of the cross section of the light beams introduced into the first optical element, which may be from the complete cross section. In addition, the light beams in the second beam path also originate from the largest possible area of the cross section of the light beams introduced into the first optical element, likewise may be from the complete cross section.

In addition, other optical elements for beam guidance of the introduced light beams (measuring beams) may be situated in the at least one first beam path and/or in the at least one second beam path. This refers to the beam guidance of the light beams to an object surface and/or of the reflected light beams away from the particular object surface in the direction of the detector of the interferometric system.

The light beams directed perpendicularly at the object surfaces and then reflected pass through the first and/or second beam paths formed in relation to an object surface and then back in the opposite direction. The reflected light beam in the first beam path and the reflected light beams in the second beam path are advantageously oriented parallel to one another at least for a longitudinal segment of their light paths.

A particularly great advantage is obtained when the first and second beam paths of the reflected light beams have at least a partial spatial superposition. It is additionally advantageous if the reflected light beams from the first and second beam paths are oriented parallel to one another within this superposition. This means that the reflected light beams from the first beam path as well as the reflected light beams from the second beam path both pass through the spatial superposition of the beam paths. The superposition of the beam paths of the reflected light beams may be introduced through the at least one first optical element system. A complete superposition of the beam paths of the reflected light beams is particularly advantageous. The superposition in the cross section advantageously corresponds to the total cross section of the light beams (measuring beams) introduced into the optical system.

The optical system may be situated in the measuring beam path of an interferometer measuring head. Thus the measuring beams are introduced into the optical system and are then used for illumination of the object surfaces.

The interferometric system has the advantage over the related art, in particular because of the special design of the optical system, that a large measurement field may ideally be implemented as an illuminated object surface, in particular when the entire cross section of the measuring beams introduced into the optical system is used to form the at least one first and/or the at least one second beam path.

It is a particularly great advantage that a large detector surface, which may be the entire detector surface, may be utilized to image the particular object surface being measured on a detector of the interferometric system. This is made possible by the fact that the beam paths of the light beams reflected on the object surfaces are superpositioned at least partially, which may be completely, and the reflected light beams may then strike the detector surface centrally. This means that at least partially identical areas of the detector surface may be illuminated in measuring a first object surface and a second object surface. Thus, in an advantageous manner when measuring circular object surfaces, the area of the detector used for imaging may be four times larger than that compared with the related art.

Thus the lateral resolution in measuring an object surface is doubled in an advantageous manner. This means that the measurement of the same object surfaces is performed much more accurately than is the case with the measurement device known heretofore. It is likewise possible to use a smaller detector with at least the same measurement accuracy and/or at least an equally large object surface to be measured. Conversely it is also possible to retain the detector size and instead to reduce the cross section of the measuring beams introduced into the optical system. Therefore the object surfaces to be measured are illuminated with a greater light intensity in an advantageous manner. Thus even with poorly reflecting object surfaces, imaging thereof on the detector is achievable.

It is particularly advantageous that with the optical system for illuminating at least one surface of the measured object, the optical elements are situated in such a way that the light beams directed at the first object surface are oriented in parallel or antiparallel to the light beams directed at the second object surface. Object surfaces situated parallel to one another may thus be illuminated. Ideally, the distance between the two object surfaces may thus be measured within the interferometric system. In the case of parallel object surfaces, the thickness of the object may thus be determined at the site of the measured object surfaces. The parallelism of the object surfaces to one another may likewise be checked.

It is particularly advantageous if at least one of the optical elements in the optical system is a beam splitter. The beam guidance of the light beam incident upon the beam splitter may then be influenced advantageously so that the light beams are split and thus at least light beams in a first beam path and at least light beams in a second beam path are formed. A beam splitter here is understood to be an optical element in which light beams in the at least one first beam path formed and in the at least one second beam path formed originate from at least one identical cross-sectional area of the light beams introduced into the beam splitter, which may be from the entire cross section. A very simple beam splitter of this type is a partially mirrorized pane of glass, which is situated at an angle of 45° to the introduced light beams, for example. A portion of the incident light beams is reflected on the object surface of the pane of glass at an angle of 90°, while another portion passes through the pane of glass. In a widely used form, such a beam splitter has two roof prisms which are glued together using an optical adhesive, for example, the UV adhesive Norland Optical Adhesive 63.

One special specific embodiment of the optical system provides for the first optical element for forming at least one first and at least one second beam path to be a beam splitter. The at least one first and at least one second object surfaces are then illuminated at measured object time.

One embodiment variant provides for a beam splitter to be used in which the light beams in the first beam path formed may be oriented at a right angle to the light beams incident upon the beam splitter. Furthermore, a beam splitter in which the light beams in the second beam path formed are rectified and directed to the light beams incident upon the beam splitter without being deflected is proposed. Such a proposed optical system may then be positioned within the interferometric system, so that the optical axis of the second beam path formed lies on the optical axis of the measuring beams formed in the interferometric system.

It is advantageous in general for the design of the optical system if at least one optical element is a mirror or a roof prism to deflect light beams by reflection into a desired or particular beam direction, for example. Deflection of light due to refraction within the roof prism may be avoided. Otherwise there will additionally be a spectral splitting of the light.

Another advantageous specific embodiment of the optical system proposes using a mirror and/or a roof prism as the second and/or third optical element(s) downstream from the first optical element. Interferometric systems usually have a fixed so-called working length. This working length is the maximum optical path traveled by measuring beams reflected on an object surface, so that a focused image of the object surface on the detector may be achieved via the objective. Roof prisms advantageously lengthen this working path by approximately one-third of the glass path traveled. In addition, the risk of air currents occurring in the beam path which usually have a negative effect on the measurement result is reduced.

It is particularly advantageous if at least one optical element of the optical system for refraction of the light beams is a lens or a lens system. The cross section of the light beams may advantageously be reduced in the direction of the light path. The light intensity in the downstream beam path may therefore be increased. It is likewise possible to increase the cross section of the light beams. On the whole, this achieves the result that a larger object surface, for example, may be illuminated.

Additional advantages, features and details of the present invention are derived from the following description of the exemplary embodiments and on the basis of the drawing.

BRIEF DESCRIPTION OF THE DRAWING

The FIGURE shows a schematic diagram of an interferometric system, including an optical system.

DETAILED DESCRIPTION

FIG. 1 shows an interferometric system 300 for measuring object surfaces, where 100 denotes an interferometer measuring head. Interferometer measuring head 100 is configured in the form of an interferometer, a white light interferometer here, for measuring a surface. This design includes a beam-generating light source 10, which emits short-coherent light beams into a lighting lens 20. Therefore, an illumination beam path 30 is formed. A first roof prism 40 situated in illumination beam path 30 deflects the light beams in such a way that the light beams are directed perpendicularly at a first beam splitter 50.

First beam splitter 50 causes the light beams to be split into one reference beam part within a reference beam path 70 and one measuring beam part within a measuring beam path 205, the reference beams being oriented in measured object direction and the measuring beams being oriented at a right angle to the light beams of illumination beam path 30 striking beam splitter 50. The reference beams are deflected via a second roof prism 60 situated in reference beam path 70 in such a way that they are directed perpendicularly at a reference element 75, for example, a reference mirror. The reference beams then reflected on reference element 75 thus pass through reference beam path 70 via second roof prism 60 and back in the opposite direction to first beam splitter 50. Due to another right-angle deflection by first beam splitter 50, the reference beams are ultimately directed through a lens 80 situated in the beam path onto a detector 90, a digital camera here. The beam direction of the reference beams striking detector 90 is opposite that of the measuring beams formed by first beam splitter 50.

An optical system 200 is situated in measuring beam path 205 of interferometer measuring head 100. The measuring beams are directed at a second beam splitter 250. The optical axis of measuring beam path 205 advantageously coincides with the optical axis of second beam splitter 250. An offset of the optical axes is allowed, in particular up to a point, which advantageously ensures that the measuring beams will strike second beam splitter 250 with the full cross section of measuring beam path 205. Second beam splitter 250 corresponds to a first optical element within optical system 200 to form a first beam path 210 and a second beam path 220. Light beams in first beam path 210 are oriented at a right angle to the measuring beams, but light beams in second beam path 220 run in a linear extension to the measuring beams striking second beam splitter 250.

The light beams may advantageously originate from the full cross section of measuring beam path 205 in first beam path 210 as well as in second beam path 220. The light beams within first and second beam paths 210, 220 are thus still measuring beams, each of which has a lower light intensity due to the splitting. Furthermore, a cross section of first and second beam paths 210, 220 advantageously corresponds to the cross section of measuring beam path 205.

A first mirror 260 is situated in first beam path 210, so that measuring beams are then directed perpendicularly at a first object surface 281 of a measured object 280 by reflection. Likewise, a second mirror 270 is situated in second beam path 220, so that measuring beams are directed at a second object surface 282 of measured object 280. Measured object 280 having second object surface 282 is situated in such a way that it rests on a radiation-permeable carrier 240. Interferometric system 300 shown here is thus situated in the space in such a way that first object surface 281 is illuminated from above in the vertical direction Y, and second object surface 282 is illuminated from beneath through beam-permeable carrier 240 in the vertical direction Y.

The measuring beams reflected on first and second object surfaces 281, 282 then pass through first and second beam paths 210, 220 via first and second mirrors 260, 270 back to additional beam splitter 250 in the opposite direction. The reflected measuring beams from second beam path 220 are then introduced in an axially parallel direction into lens 80, for example, a telecentric lens, without being deflected, and are directed onto detector 90. However, the measuring beams in first beam path 210 are deflected by second beam splitter 250 at a right angle to their previous beam direction and introduced in an axially parallel direction into lens 80 and then also directed perpendicularly at detector 90.

The beam path of the measuring beams reflected on first object surface 281 and the beam path of the measuring beams reflected on second object surface 282 are congruent within imaging beam path 230 of lens 80. The reflected measuring beams striking detector 90 interfere with the reference beams, which are also contained in imaging beam path 230 and strike detector 90.

Measured object 280 is situated within optical system 200 so that the measuring beams, which strike first object surface 281 and are then reflected, and the measuring beams, which strike second object surface 282 and are also reflected, pass through different optical paths. The total path difference of the two optical path lengths may be greater than the coherence length of light source 10. This prevents the measuring beams reflected by first object surface 281 and second object surface 282 from interfering with one another. Interference with the reference beams occurs when the optical path length of the measuring beams matches the optical path length of the reference beams. To be able to alter the path difference between the measuring beams and the reference beams, the optical path length of the reference beams and thus the path difference between the measuring beams and the reference beams are adjustable by situating reference element 75 displaceably on the optical path axis of the reference beams with the aid of an adjusting arrangement 150, including a piezoelectric actuator.

A change in and adaptation of the optical path length, which is implemented, if necessary, for the measuring beams of first object surface 281 or second object surface 282, may be achieved by a relative displacement of interferometer measuring head 100 and optical system 200 in the direction of optical axis M with the aid of the adjusting arrangement. According to an alternative embodiment variant, first mirror 260, second mirror 270 and/or second beam splitter 250 are each positioned displaceably in the direction of their optical axis A, B, C with the aid of the adjusting arrangement, additionally with a possible displacement of interferometer measuring head 100 with the aid of a suitable adjusting arrangement, if necessary.

The distance of first object surface 281 from second object surface 282 corresponds to the object thickness. Before the object thickness of a measured object 280 is ascertained by a measurement operation, interferometric system 300 is calibrated with a gauge block of known thickness in a first step. The gauge block is positioned on carrier 240 in place of measured object 280. Interferometer measuring head 100 is shifted into the position in which the optical path from beam splitting surface 250a of beam splitter 250 to first object surface 281 corresponds to the optical path from beam splitting surface 250a of second beam splitter 250 to reference element 75. In this position, the measuring beams reflected on first object surface 281 then interfere with the reference beams, so that a corresponding first interference pattern becomes visible on detector 90. The gauge block is positioned in such a way that the optical path from beam splitting surface 250a of second beam splitter 250 to second object surface 282 is slightly longer or shorter than the optical path length of the reference beams. There is thus no interference of the measuring beams reflected on second object surface 282 with the reference beams.

Thus, a second interference pattern is not visible on detector 90. Only by shifting a component of interferometric system 300, for example, reference element 75 with the aid of the adjusting arrangement 150 in the direction of optical axis S of reference beam path 70, does the second reference pattern become visible due to the resulting change in the path difference between the measuring beams and the reference beams on detector 90. At this time, the first reference pattern on the detector is no longer visible. The shift in reference element 75 between the first interference pattern formed by first object surface 281 and the second interference pattern formed by second object surface 282, for example, is measured with a high-precision position sensor. The displacement path of reference element 75 thereby ascertained is stored as a calibration constant. Measured object 280 is then measured in a similar way and the distance of reference element 75 between the first interference pattern formed and the second interference pattern formed is ascertained. The object thickness is then calculated based on the known thickness of the gauge block, the previously ascertained calibration constants, and the distance of reference element 75 ascertained for measured object 280.

One possibility for adjusting the path difference between the measuring beams and the reference beams is explained below. It is assumed here that the path difference is achieved by shifting reference element 75 with the aid of the adjusting arrangement 150, including a piezoelectric actuator. Additionally or alternatively, the path length of the measuring beams may be varied using a suitably triggered adjusting arrangement.

Via a control line 155, adjusting arrangement 150 has a signal-conducting connection to the synchronization arrangement 160, which in turn have a signal-conducting connection to detector 90, embodied as a digital camera. The detector signal, a video signal here, is sent to the synchronization arrangement 160 over a signal line 165. The synchronization arrangement 160 includes an isolation circuit (not shown in detail), with the aid of which a trigger signal is always generated when the synchronization arrangement 160 detects the occurrence of a frame synchronization pulse in the detector signal. The particular trigger signal is used by the synchronization arrangement 160 to increment a digital counter, implemented as a counter circuit, of the synchronization arrangement 160 by a defined value.

The particular instantaneous counter value is sent to a digital-analog converter (not shown) of the synchronization arrangement 160 which triggers the adjusting arrangement 150, which regulate the path difference at a value proportional to the output voltage of the digital-analog converter. In other words, the adjusting arrangement 150 adjusts a relative position, which is proportional to the output voltage of the digital-analog converter, between reference element 75 and detector 90. This achieves the result that a defined relative position between reference element 75 and detector 90 and thus a defined path difference corresponds to each image generated by detector 90. The counter circuit of the synchronization arrangement 160 may be implemented as an FPGA, so that changes in the circuit may be implemented by simply programming an EEPROM. The adjusting movement of beam splitter 50 (optical element) with the aid of the adjusting arrangement 150 may take place in uniform increments as a function of the image frequency of the detector. A continuous adjusting movement or a complex adjusting pattern may also be implemented by integration of a lookup table.

What is claimed is:

1. An interferometric system for measuring a measured object, comprising:
    a beam splitter splitting light beams into measuring beams directed at the measured object and reference beams directed at a reference element;
    an actuator adjusting the reference element to change a path difference between the measuring beams and the reference beams;
    a detector for recording images of the superposition of the reference beams and the measuring beams reflected by the measured object;
    a separating circuit generating an actuator trigger signal as a function of an occurrence of a frame synchronization pulse in a video signal of the detector; and
    a counter circuit altering a counter value as a function of the generated actuator trigger signal, wherein the actuator adjusts the reference element proportional to the counter value and in synchronization with the images recorded by the detector.

2. The interferometric system of claim 1, wherein the actuator adjusts the reference element so that a defined path difference corresponds to each image recorded by the detector.

3. The interferometric system of claim 1, wherein the actuator includes at least one piezoelectric actuator.

4. The interferometric system of claim 1, wherein the separating circuit is configured and situated to evaluate the video signal and detect the frame synchronization pulse.

5. The interferometric system of claim 1, wherein the separating circuit is configured to generate the actuator trigger signal on each occurrence of the frame synchronization pulse, via an isolation circuit.

6. The interferometric system of claim 5, wherein the counter circuit includes a counter whose counter value is incremented by a defined value each time the actuator trigger signal is generated.

7. The interferometric system of claim 6, wherein the path difference, which is adjustable via the actuator, is proportional to the counter value.

8. The interferometric system of claim 6, wherein the counter value is sent to a digital-analog converter, and the actuator adjusts the path difference proportional to an output voltage of the digital analog converter and the counter value.

9. The interferometric system of claim 6, wherein the counter is implemented in a programmable integrated circuit, which is an FPGA.

10. The interferometric system of claim 1, wherein the detector includes a digital camera.

11. The interferometric system of claim 1, further comprising:
    a light source to emit a shared short-coherent light for generating the measuring beams and the reference beams.

12. A method for adjusting a path difference between measuring beams of a measuring beam path directed at a measured object and reference beams of a reference beam path directed at a reference element in an interferometric system, the method comprising:
  recording via a detector images of a superposition of the reference beams and the measuring beams reflected by the measured object;
  detecting a frame synchronization pulse in a video signal of the recorded images at the detector;
  generating an actuator trigger signal as a function of an occurrence of the frame synchronization pulse;
  altering a counter value as a function of the generated actuator trigger signal; and
  adjusting the path difference proportional to the altered counter value in synchronization with the images recorded by the detector.

* * * * *

UNITED STATES PATENT AND TRADEMARK OFFICE
CERTIFICATE OF CORRECTION

PATENT NO.      : 8,625,103 B2                         Page 1 of 1
APPLICATION NO. : 12/736656
DATED           : January 7, 2014
INVENTOR(S)     : Fleischer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this
Twenty-second Day of September, 2015

Michelle K. Lee
*Director of the United States Patent and Trademark Office*